March 10, 1964

R. A. SOMMER ET AL 3,124,672

WELDING INDUCTOR

Filed Aug. 1, 1961

INVENTORS
RICHARD A. SOMMER &
GEORGE C. NEBESAR
BY *Alfred C. Body*
ATTORNEY

United States Patent Office 3,124,672
Patented Mar. 10, 1964

3,124,672
WELDING INDUCTOR
Richard A. Sommer, Parma, and George C. Nebesar, Cleveland, Ohio, assignors to The Ohio Crankshaft Company, Cleveland, Ohio, a corporation of Ohio
Filed Aug. 1, 1961, Ser. No. 128,462
7 Claims. (Cl. 219—8.5)

This invention pertains to the art of high frequency induction welding and more particularly to a welding inductor.

The invention is particularly applicable to induction welding of spiral wound strip to form pipe, tubing or other round cylindrically formed articles and for the present will be described with particular reference to this method.

In the art of making spiral wound pipe, the strip stock is wound into the form of a helix by advancing it onto a rotating mandrel, or forming device, in such a manner that the edges contact each other at a fixed juncture point just as the strip of stock comes into contact with the mandrel. Heat is then applied to the edges of the strip to bring them to a high temperature at the juncture point. By appropriate application of pressure to the edges as they come together, coupled with a high temperature of the edges at the juncture point, a weld is obtained. If this is done on a continuous bases, long lengths of pipe may be produced. The size of the pipe depends upon the size of the mandrel used or upon the size of the forming device used. Having the pipe formed by strip material wound in a helix and requiring the edges to be welded together, presents a rather unusual problem and the configuration of an inductor to do this is necessarily unique.

To heat spiral wound pipe, it has been conventional in the past to provide inductors in the shape of an arc segment. The inductors have had to be located after the juncture point of the strip and have been used to heat the edges in the abutted position. The configuration of these inductors has been a split-return type of circuit and this circuit applied to the abutted pipe edges gives a current flow along the edges of the abutted strip. This type of inductor has had only moderate success because the induced current flow was not across the juncture point; therefore, as an aid to effective heating, iron laminations had also been added to this arc segment. These iron laminations overheat and burn out and have been a service problem in their replacement. Some slight power loss to the iron laminations is also involved.

The present invention contemplates the use of an inductor that completely encircles the pipe outside diameter without contacting the pipe, and operates without the use of laminations.

In accordance with the present invention an inductor for heating to the welding temperature the juncture point of a strip or ribbon as it is wound into a helix to form a helically welded pipe is provided, such inductor being comprised of a single-turn or C-shaped loop with the ends adjacent but in axially spaced relationship, such ends being located adjacent to and on each axial side of said juncture point and means in the form of a V interconnecting said ends with the apex of said V being located generally over said juncture point and the legs extending generally parallel to said edges in advance of said juncture point.

The principal object of the invention is to provide a new and improved inductor which, by its construction, heats to proper welding temperature the edges of the helically formed strip, thereby enabling the production of helically welded pipe.

Another object is to provide a new and improved inductor which allows the user therefore to make important use of the currents induced in the part and controlled by the inductor contour to be most effective in raising the temperature of the strip material at the juncture point.

Another object of the invention is to provide a means of applying welding heat to spiral wound strip to form pipe in an effective and efficient manner.

In still another object of the present invention is the provision of an inductor which will preheat the strip edges before the actual welding operation. By the construction of this inductor, one revolution of the pipe strip is subject to circulating currents that are induced, and by the particular location of the inductor, the edge thereof becomes heated and thereby aids the actual welding operation.

Still a further object of this invention is to provide a new and improved induction heating coil having a contoured segment that preheats the converging edges of a helically wound conductive strip and welds the adjacent edges of the strip together.

A further object of this invention is to provide an induction heating coil that preheats and welds the converging edges of a helically wound strip of electrically conductive material by high frequency induced currents.

Still another object of this invention is to provide a method of welding helically wound electrically conductive material whereby the converging edges of the strip material are preheated by inductive currents having opposite polarity and the junction between the converging edges is heated to a welding temperature by a concentration of the induced currents.

Further objects and advantages of the present invention will be apparent from the following description, reference being had to the accompanying drawings wherein a preferred form of invention is disclosed and in which.

Figure 1:
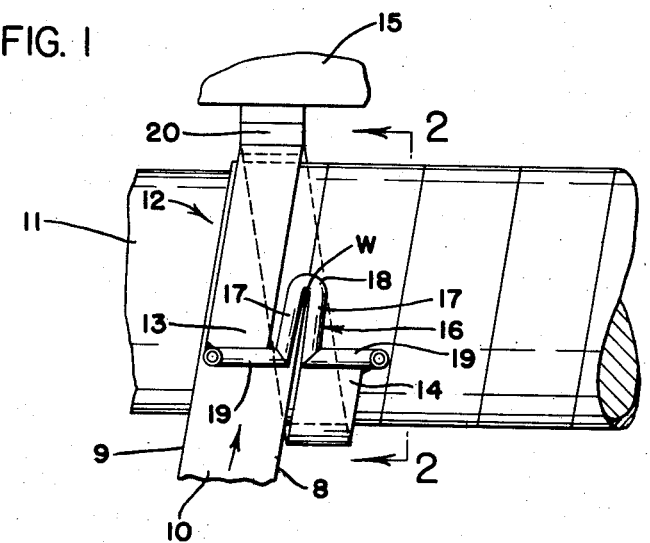
FIG. 1 is a plan view showing the use of the invention to weld a helically wound tube.

Referring now to the drawings wherein the showings are for the purposes of illustrating a preferred embodiment of the invention only and not for the purposes of limiting same, FIG. 1 shows a metal strip 10 having a leading edge 8 and a trailing edge 9 being advanced and continuously wound onto a rotating mandrel 11 so that the metal strip forms a helix with the leading edge 8 of the advancing strip abutting the trailing edge 9 of a revolution previously formed around the mandrel.

The strip material 10 may be of any known electrically conductive material such as steel, copper or the like and may have any desired thickness. The internal diameter of the helically wound tube will, of course, be determined by the outer diameter of the mandrel 11.

As the strip is wound on the mandrel, its leading edge 8 converges on and abuts the trailing edge 9 of the preceding turn of the strip at a fixed juncture point W which is generally located on the tangential point determined by the strip as it approaches the mandrel.

To effect a welding of the leading and trailing edges 8, 9, it is necesary to bring this juncture point W to the welding temperature of the metal. In accordance with the present invention, a novel inductor 12 is provided to weld the converging edges. In the embodiment of the invention shown, this inductor is formed of a flat copper conductor in the form of a C-shaped loop having ends 13, 14 axially offset one from the other such that the pitch of the loop is substantially the same as the pitch of a turn of the strip 10 after it is wound onto the mandrel. These ends are generally in the same axial plane; however, the end 13 may extend tangentially from the circumference of the inductor to conform with the portion of the strip being advanced toward the mandrel. It will be noted that the sides of the inductor 12 are substantially parallel to the edges 8, 9.

The end 13 of the inductor 12 is positioned in slightly spaced relationship with the approaching strip 10 while the end 14 is positioned in slightly spaced relationship from the first turn of the strip on the mandrel. These ends 13, 14 as shown are located slightly in advance of the juncture point W, considered in the direction of movement of the strip 10.

Figure 3:
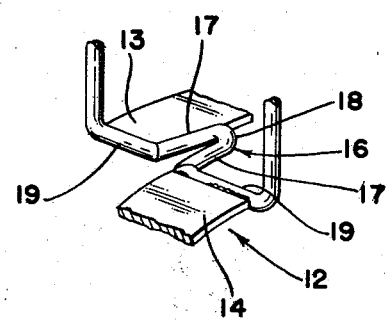
FIGURE 3 is a fragmentary prospective view of the inductor above the welding point.

A substantially V-shaped copper conductor 16 is comprised of a pair of legs 17 extending from the ends 13 and 14 towards the juncture point W. These legs are preferably arcuately shaped to conform with the circumferential surface of the mandrel and are spaced from the helically wound tube. Outwardly extending parallel portions 19 of the copper conductor 16 are fastened to the ends 13, 14. The legs 17 converge at an integrally formed apex 18 located adjacent to the fixed juncture point W. To dissipate the heat generated by the electric currents induced in the conductor 16, it is formed of a tube and a cooling fluid is passed through this tube. The conductor 16 is shown in detail in FIG. 3.

Figure 2:
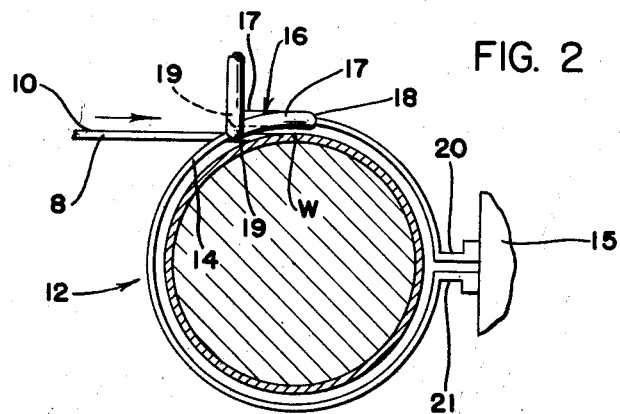
FIG. 2 is a side elevational view of FIG. 1.

In FIG. 2 the inductor 12 is shown split at some suitable point remote from the ends 13, 14 and a pair of leads 20, 21 extend away therefrom and are connected to a suitable source of high frequency electrical power 15. The frequency of the power source depends somewhat upon the thickness of the strip 10 and in practice the frequency varies between 1–450 kc. per second.

In operation, the high frequency currents in the conductor 12 flow circumferentially from one lead 20 to the end 13, thence through the first leg 17 to the apex 18 and from the apex 18 through the opposite leg 17 to the end 14 through the conductor 16 to the lead 21.

These high frequency currents cause a similar induced current to flow in the strip directly under the inductor. Thus induced high frequency currents will flow in the metal strip 10 at a point immediately under the inductor 12. Assuming instantaneous current from end 13 to end 14, immediately under the end 13, the current will reverse its direction and flow along the edges 8 to the juncture point W, across the juncture point W to the other edge 9 and in the opposite direction to the direction of movement of strip 10 to the end 14. Thus the current loop is completed. Of course, as the polarity of the high frequency source reverses, the direction of current flow in the current loop will also be reversed. In this operation, the induced high frequency current by virtue of the proximity effect, will be concentrated at the surfaces of the edges 8, 9 to effect a preheating action thereon so that when the edges 8, 9 reach the juncture point W they will be at an elevated temperature. Therefore, the concentrated induced current at the juncture point W is used only to raise the temperature of the edges from the preheated elevated temperature to the welding temperature. Since the concentrated induced current under the apex 18 is used to weld previously heated metal, an efficient welding action takes place.

It will be appreciated that large amounts of heat will also be developed in the inductor 12 and if desired, this heat may be removed by providing the inductor 12 with a central opening and circulating water therethrough. This is conventional to the art of high frequency induction heating. It will be appreciated that a roller or thrust block may be employed to force the edges 8, 9 into abutting engagement, but as such rollers or thrust blocks are conventional, they are not shown in the drawings. In some instances, it has been found that the preheating of the converging edges 8, 9 is not uniform, and in such event, the length of the legs 17 of the V-shaped inductor may be adjusted to compensate for such tendency of uneven heating and to insure that both edges 8 and 9 will be heated to the same temperature when they reach the weld point W. It is to be noted that the inductor 12 is composed of a relatively wide flat strip such that the path of induced current flow will have a maximum width and thus a minimum resistance to reduce the heating effect in the strip remote from the edges 8, 9. However, the legs 17 of the V-shaped conductor and the apex 18 are relatively narrow, so that the current that flows due to a voltage potential induced by the conductor 16 will have a maximum concentration and thus will produce the maximum amount of heat in the edges 8, 9 where the heating is desired.

While the form of the embodiment of the invention as herein disclosed constitutes a preferred form, it is to be understood that other forms might be adopted as they come within the scope of the claims which follow.

Having thus described our invention, we claim:

1. In an inductor for forming continuous tubing from a metal strip helically wound on a mandrel, said strip having a leading edge and a trailing edge that are welded together by high frequency induced current and said current being induced in said strip by an induction coil adjacent the joint between the edges of said strip, the improvement comprising: said inductor having a first and second portion, said first portion being flat, generally C-shaped and extending over substantially the complete circumference of the mandrel and spaced only slightly radially outward from the mandrel, said first portion having axially spaced terminal ends close to each other adjacent the joint between the leading and trailing edges of said strip and said second portion electrically joining the ends of said first portion and forming an electrical loop extending along said edges and across said joint, said second portion spaced only slightly radially from said edges.

2. The improvement defining claim 1 wherein the electrical loop comprises a first and a second leg joined by an integral apex portion, said first leg extending above the leading edge of said strip, said second leg extending above the trailing edge of said strip and said apex portion located above the point of convergence between said edges, and said legs being uniformly spaced from said edges.

3. The improvement as defined in claim 1 wherein said C-shaped first portion comprises a solid, substantially wide electrical conductor.

4. An inductor for forming continuous tubing from a metal strip helically wound on a mandrel, said strip having a leading edge and a trailing edge converging at a point on the outer surface of said mandrel, said inductor comprising, a first portion and a second portion, said first portion having two ends and being substantially C-shaped to match the circumferential surface of said mandrel, said second portion electrically joining the ends of said first portion and forming an electrical loop, said loop extending along said edges to define a preheat portion adjacent said converging edges and across said joint to define a welding portion adjacent said point of convergence, said electrical loop being spaced only slightly radially from said edges and said joint.

5. An inductor as defined in claim 4 wherein said preheat portion comprises a first leg and a second leg, said first leg extending above said leading edge and said second leg extending above said trailing edge.

6. An inductor as defined in claim 5 wherein said welding portion comprises an integral apex portion located above said point of convergence.

7. An inductor for forming continuous tubing from a metal strip helically wound onto a mandrel, said strip having a leading and a trailing edge converging at a point on the outer surface of said mandrel, said inductor comprising: a first portion and a second portion, said first portion comprising a flat conductor and having a width not substantially smaller than the width of said strip, said flat conductor extending substantially around the complete circumference of said mandrel and having spaced ends at one position and means for joining said inductor to a high frequency power source at another position, said second portion electrically joining the ends of said first portion and forming an electrical loop, said loop extending along said edges to define a preheat portion adjacent said converging edges and across said point to define a welding portion adjacent said point of convergence, said electrical loop being spaced only slightly radially from said edges and said joint respectively.

References Cited in the file of this patent

UNITED STATES PATENTS

| | | |
|---|---|---|
| 2,841,678 | Thorson | July 1, 1958 |
| 2,873,353 | Rudd | Feb. 10, 1959 |